March 23, 1937.     J. T. HUGHES     2,074,334
ADJUSTABLE STEERING WHEEL
Filed Dec. 4, 1935
Fig.1.
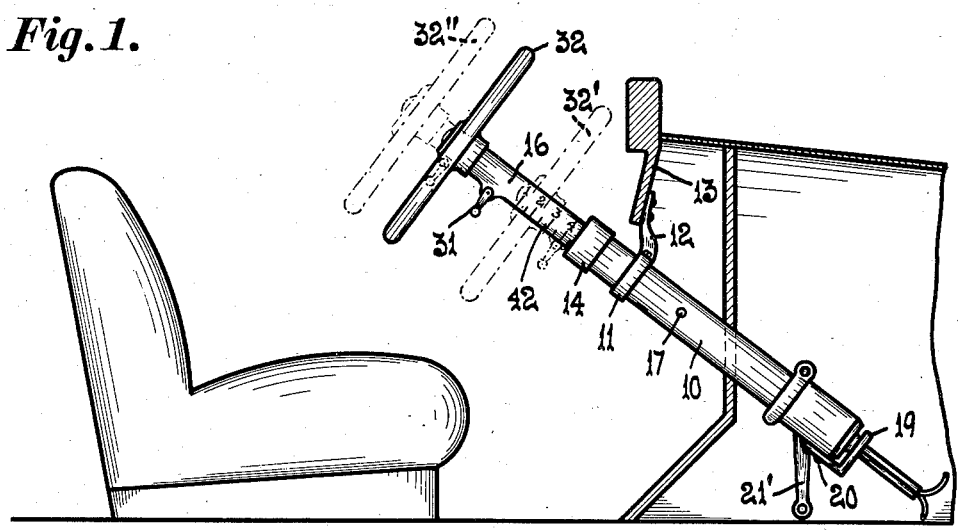
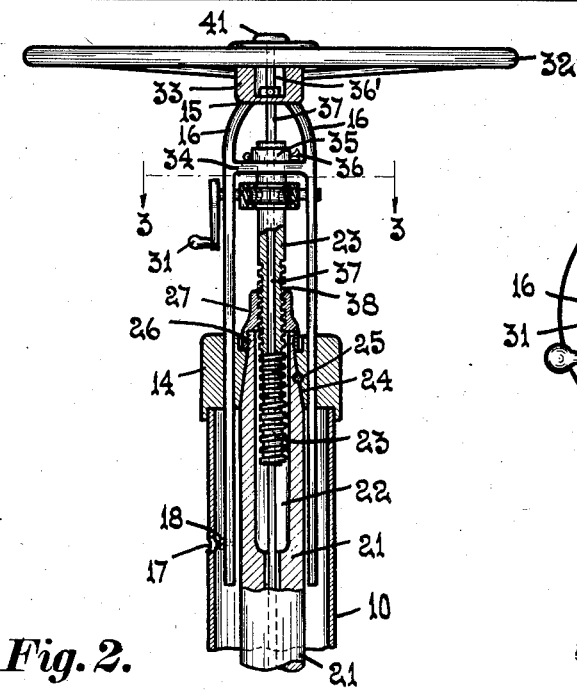
Fig.2.
Fig.3.
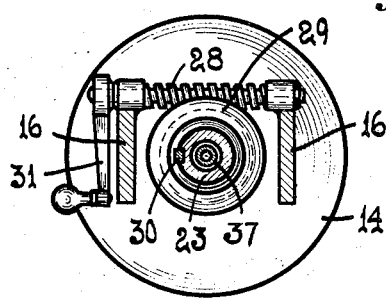
Fig.4.
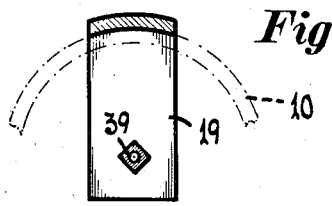
Fig.5.
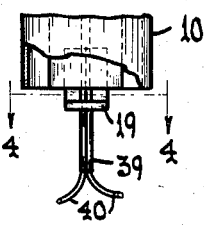
Inventor
J.T.Hughes
By Arthur H. Sturges
Attorney Patented Mar. 23, 1937

2,074,334

UNITED STATES PATENT OFFICE 2,074,334

ADJUSTABLE STEERING WHEEL

John T. Hughes, Chicago, Ill.

Application December 4, 1935, Serial No. 52,867

1 Claim. (Cl. 74—493)

This invention relates to steering gears for self-propelled vehicles and more particularly to the hand operated steering wheels thereof and has for an object to provide means for adjusting the height of said wheels with respect to their carrying columns and with respect to the driver's seat of the vehicle, said means to be operable in a more facile and rapid manner than heretofore.

A further object of the invention is to provide means for extending a steering column together with the wheel thereof by a manually applied rotary motion, said means being such that when the hand of the operator is removed from the adjustment actuating part of the mechanism the wheel and column will remain in a selected operative position during use.

A still further object of the invention is to provide means for accommodating the difference in girth, size and height of several drivers of a vehicle with respect to the seat and steering wheel thereof, and to provide indicia on the new device whereby an operator may readily adjust the wheel to a selected position to accommodate individual sizes and requirements in advance of occupying the driver's seat of the vehicle.

As heretofore practiced it has been necessary to provide extra wedge-shaped cushions for use between the back of the driver and the back of the driver's seat in instances where the vehicle is not provided with an adjustable seat, the latter usually being difficult and laborious to adjust for accommodating the size of several drivers of the same vehicle, and the present invention aims to provide means for obviating the undesirable features of prior practices.

With the foregoing and other objects in view the invention will be more fully described hereinafter and will be more particularly pointed out in the claim appended hereto.

In the drawing wherein like symbols refer to like or corresponding parts throughout the several views:

Figure 1 is a vertical section of a portion of a self-propelled vehicle such as an automobile having the preferred embodiment of the present invention applied thereto in a position of use.

Figure 2 is a longitudinal sectional view of the adjustable steering column of the present invention, and Figure 3 is a transverse section thereof taken on line 3—3 of Figure 2.

Figure 4 is a detail of an arm employed, the view being taken on line 4—4 of Figure 5.

Figure 5 is a plan view, partly in section, of a fragment of a steering mast.

Referring now to the drawing for a more particular description, 10 indicates a tubular mast or support which may be secured in a rigid position with respect to the vehicle by any suitable means such as the clamp collar 11 having an arm 12 fastened to the cowlboard 13 of the vehicle by suitable detents. At the lower end of the mast the latter may be secured, for use with certain types of vehicles, by any suitable means, not shown. The upper end of the mast 10 is provided with a cover cap 14 adapted to have rotary movements thereon. The extensible portion 15 of the steering column is bifurcated, the oppositely disposed legs 16 thereof being slidable longitudinally through the cap 14, being guided thereby. The mast 10 is provided with an aperture 17 through which a detent screw 18 may be threadedly secured to a leg of said bifurcated member for preventing a separation from said cap at undesired times.

At the lower end of the device an arm 19 is secured thereto by means of rivets 20 or the like, said arm preventing a rotation of a later described conduit.

A steering column 21 is provided within the mast, having a longitudinally extending bore for purposes later described; and it will be understood that at the lower end of the column 21 any suitable arrangement of parts, such as worm gears, links or the lever 21', is provided for communicating steering motion to the wheels of the vehicle for steering purposes, said levers, links and means being of various types in different vehicles for accommodating the individual requirements thereof.

The column 21 at its upper end is provided with an elongated recess 22 having a screw 23 disposed therein, the latter being adjustable longitudinally and selectively of the column 21 as later described.

The upper end of the column 21 is tapered as indicated at 24 and secured to the cap 14 by any suitable means such as the pin 25, whereby the cap and column are normally locked together. Screw threads 26 are provided at the upper end of the column 21 for attaching thereto a boss 27, the latter being provided with a threaded bore, said threads co-acting with the threads of the screw 23, as shown in Figure 2. The boss is in effect a part of the cap, the latter having an annular flange extending over and about the end of the mast 10 for providing a journal and positioning the cap centrally of the mast for rotary movements on the latter.

As best shown in Figure 2 the legs 16 of the member 15 provide a mounting for a transversely disposed worm-shaft 28, said worm having a driving connection with a worm wheel 29. The wheel 29 is keyed or splined as at 30 to the screw 23.

The worm-shaft 28 is provided with a crank handle 31 adapted to be manually rotated for communicating a corresponding movement to the worm-shaft 28 and worm wheel 29, the latter in turn communicating the motion to the screw 23 for moving the latter longitudinally with respect to its boss 27 for the overall purpose of moving the legs 16 longitudinally and for positioning the steering wheel 32 toward or away from the upper end of the mast 10, said legs 16 sliding through the cover cap 14 between the inner annular wall of the mast and the steering column 21. The hub 33 of the steering wheel is preferably formed integrally therewith and also with the legs 16 of the extensible portion of the steering column 21 or member 15.

Between the legs 16 and adjacent the junction thereof with the hub 33 a transversely disposed web 34 provides a journal bearing for the end of the screw-shaft 23, said end having a detent collar 35 secured by means of a cotter pin 36.

As thus described it will be understood that rotary motion applied to the steering wheel 32 by the operator will cause a corresponding movement of the legs 16 and cover cap 14 together with the steering column 21 for an application of the motion to the front wheels of the vehicle through the gear or means between said front wheels and the lower end of said column 21, said particular gear or means as heretofore mentioned not being illustrated.

The hub 33 is preferably provided with a recess 36', through which extends a conduit pipe 37, the latter also extending through the longitudinally disposed bore 38 of the screw 23, said pipe being adapted to house later mentioned electrical conductors or wires. The lower end portion 39 of the pipe 37 is rectangular in cross section and extends outwardly of the steering column 21, as best shown in Figure 5, and is prevented from having rotary movements by means of the arm 19, the latter having an aperture which is rectangular in plan, as shown in Figure 4, for receiving said end portion 39 of the pipe 37, said arm as heretofore described being secured stationary with the non-rotatable mast 10.

Electrical conductors or wires are indicated at 40, the latter being in communication with a horn button switch 41 mounted upon the hub of the steering wheel, said wires extending through the conduit pipe 37 and also being in electrical communication with a horn or similar signalling mechanism and the battery of the vehicle.

As best shown in Figure 1, one of the legs 16 is provided with indicia indicated at 42 which may represent inches and fractions thereof and may be used in conjunction with the upper end of the cover cap 14 for purposes later mentioned.

In operation the lever handle or crank 31 may be rotated for causing the steering wheel 32 to be positioned closely adjacent the cap 14, as shown by the dotted line position 32' of said wheel in Figure 1 or said wheel may be extended to the dotted line position 32" thereof for accommodating the individual requirements of a driver and the latter may utilize the indicia 42 for positioning said wheel prior to becoming seated in the driver's seat in a manner whereby his girth is accommodated when seated.

Among other advantages of the invention it is considered pertinent to mention that during winter driving people wearing bulky overcoats may adjust the steering wheel for accommodating the added bulk by readily moving said wheel towards the cowlboard 13.

It is obvious that various changes and modifications may be made in the details of construction and design of the above specifically described embodiment of this invention without departing from the spirit thereof, such changes and modifications being restricted only by the scope of the invention as herein claimed.

What is claimed is:—

A steering device for vehicles comprising a stationary hollow mast, a cap journalled on one end thereof and provided with oppositely disposed apertures, a column within the mast secured to said cap, said column provided with a bore, a threaded shaft operatively engaged with the cap and extending into said bore, a bifurcated member provided with a steering wheel, the legs of said member slidably extending through the apertures of the cap for communicating corresponding movements of said wheel to said column, means for communicating steering movements of said column to the wheels of the vehicle, and a worm gear carried by said member and having a driving connection with said shaft for selectively positioning said steering wheel with respect to said cap.

JOHN T. HUGHES.